(12) United States Patent
Dickson

(10) Patent No.: US 9,611,907 B2
(45) Date of Patent: Apr. 4, 2017

(54) AFTERTREATMENT THERMAL MANAGEMENT VIA CLUTCH ASSEMBLY

(71) Applicant: CUMMINS INC., Columbus, IN (US)

(72) Inventor: Jonathan A. Dickson, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 14/710,895

(22) Filed: May 13, 2015

(65) Prior Publication Data

US 2015/0330277 A1   Nov. 19, 2015

Related U.S. Application Data

(60) Provisional application No. 61/993,813, filed on May 15, 2014.

(51) Int. Cl.
*F01N 3/20* (2006.01)
*F16D 48/06* (2006.01)
*F02D 29/02* (2006.01)

(52) U.S. Cl.
CPC .......... *F16D 48/06* (2013.01); *F01N 3/2006* (2013.01); *F01N 3/2066* (2013.01); *F02D 29/02* (2013.01); *F16D 2500/30406* (2013.01); *F16D 2500/3166* (2013.01); *F16D 2500/3168* (2013.01); *F16D 2500/50676* (2013.01); *F16D 2500/70406* (2013.01); *F16D 2500/70426* (2013.01)

(58) Field of Classification Search
CPC .............. F01N 3/2006; F01N 2560/06; F01N 2900/1404; F01N 2900/1602; F02D 41/024; F16D 2500/30406; F16D 2500/3168; F16D 2500/70426
See application file for complete search history.

(56) References Cited

U.S. PATENT DOCUMENTS

| | | |
|---|---|---|
| 6,935,989 B2 | 8/2005 | Shibagaki |
| 7,370,470 B2 | 5/2008 | Graupner et al. |
| 7,469,533 B2 | 12/2008 | Dawson et al. |

FOREIGN PATENT DOCUMENTS

JP    2009255701 A  * 11/2009

* cited by examiner

*Primary Examiner* — Audrey K Bradley
(74) *Attorney, Agent, or Firm* — Faegre Baker Daniels LLP

(57) ABSTRACT

A vehicle system comprising: an engine; an aftertreatment system that receives exhaust gas from the engine; a clutch assembly; and a controller configured to direct adjusting slippage of the clutch assembly based on a first temperature that is selected from the group consisting of a temperature of the aftertreatment system and an expected temperature of the aftertreatment system.

20 Claims, 2 Drawing Sheets

AFTERTREATMENT THERMAL MANAGEMENT VIA CLUTCH ASSEMBLY

PRIORITY

The present application is a non-provisional application of U.S. Provisional Application No. 61/993,813 filed May 15, 2014 titled AFTERTREATMENT THERMAL MANAGEMENT VIA CLUTCH ASSEMBLY, the disclosure of which is incorporated herein by reference and the priority of which is hereby claimed.

FIELD OF THE DISCLOSURE

The present disclosure generally relates to internal combustion engine systems that include aftertreatment systems. The present disclosure relates more specifically to engine systems that utilize clutch assembly settings to impact aftertreatment systems operation.

BACKGROUND OF THE DISCLOSURE

Modern internal combustion engines must meet stringent emission standards that include limits on the amount of soot and nitrogen oxides ($NO_x$) that may be emitted to the atmosphere. Many engines now utilize aftertreatment systems to reduce emissions to regulatory levels before release to the atmosphere. Such aftertreatment systems may operate most effectively within a certain internal temperature range, and particularly above a minimum internal temperature. However, the temperature of an aftertreatment system may be outside of the desired operating temperature range, especially upon startup of the engine and under certain engine operating conditions when load on the engine is diminished. Therefore, a need remains for systems, apparatuses, and methods to maintain the temperature of aftertreatment systems within a desired temperature range.

SUMMARY

The present disclosure provides a system and method for controlling the temperature of an aftertreatment system by adjusting slippage of a clutch assembly.

According to an exemplary embodiment of the present disclosure, a vehicle system is provided comprising: an engine; an aftertreatment system that receives exhaust gas from the engine; a clutch assembly; and a controller configured to direct adjusting slippage of the clutch assembly based on a first temperature that is selected from the group consisting of a temperature of the aftertreatment system and an expected temperature of the aftertreatment system.

According to another embodiment of the present disclosure, a method is provided including: adjusting slippage of a clutch assembly responsive to determining a first temperature selected from the group consisting of a temperature of an exhaust aftertreatment system and an expected temperature of the exhaust aftertreatment system.

According to another embodiment of the present disclosure, a computer readable medium containing non-transitory instructions thereon, that when interpreted by at least one processor cause the at least one processor to: adjust slippage of a clutch assembly responsive to determining a first temperature selected from the group consisting of a temperature of an exhaust aftertreatment system and an expected temperature of the exhaust aftertreatment system.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
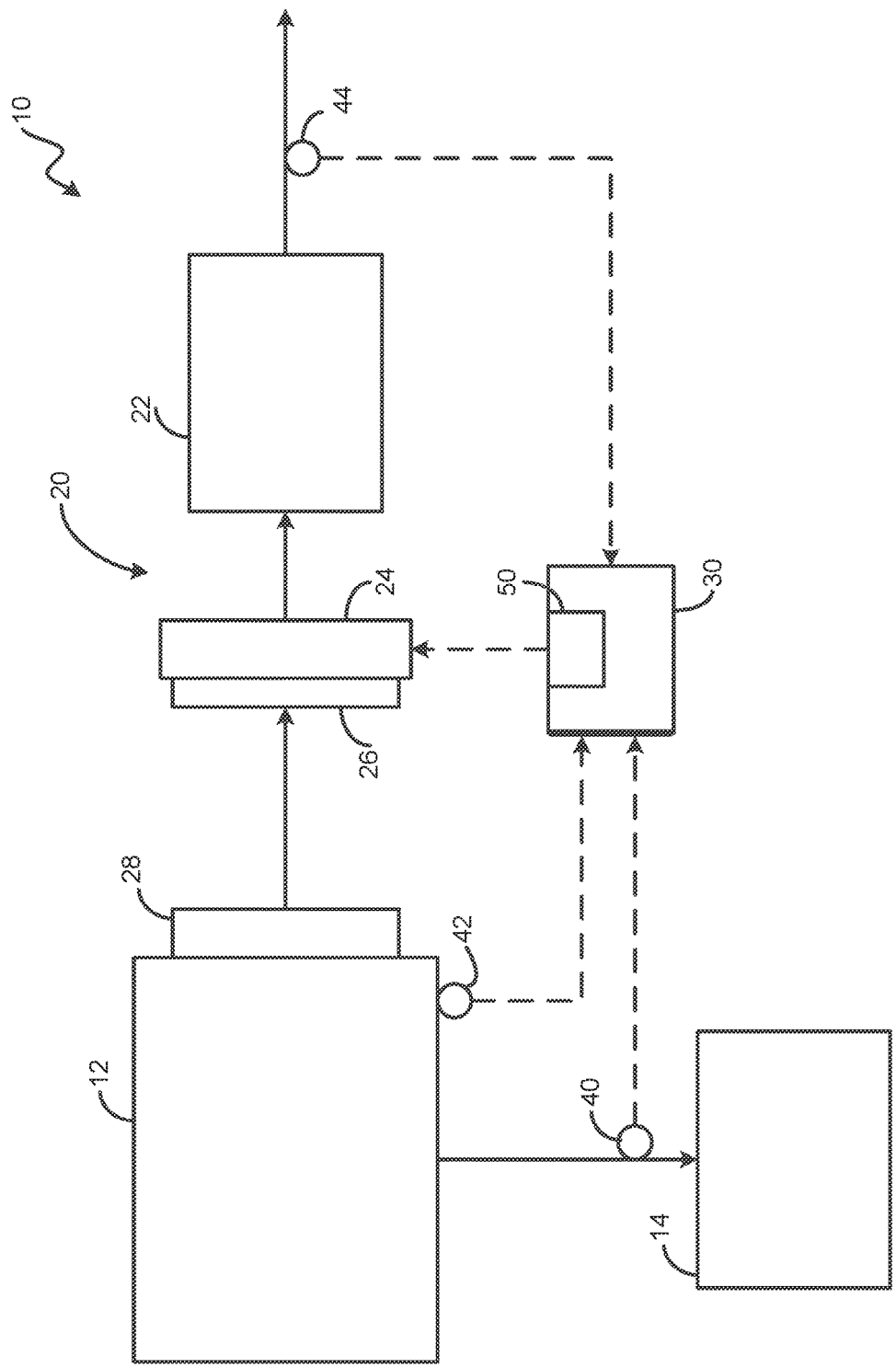
FIG. 1 is a schematic block diagram of an embodiment of a vehicle system according to the present disclosure.
Figure 2:
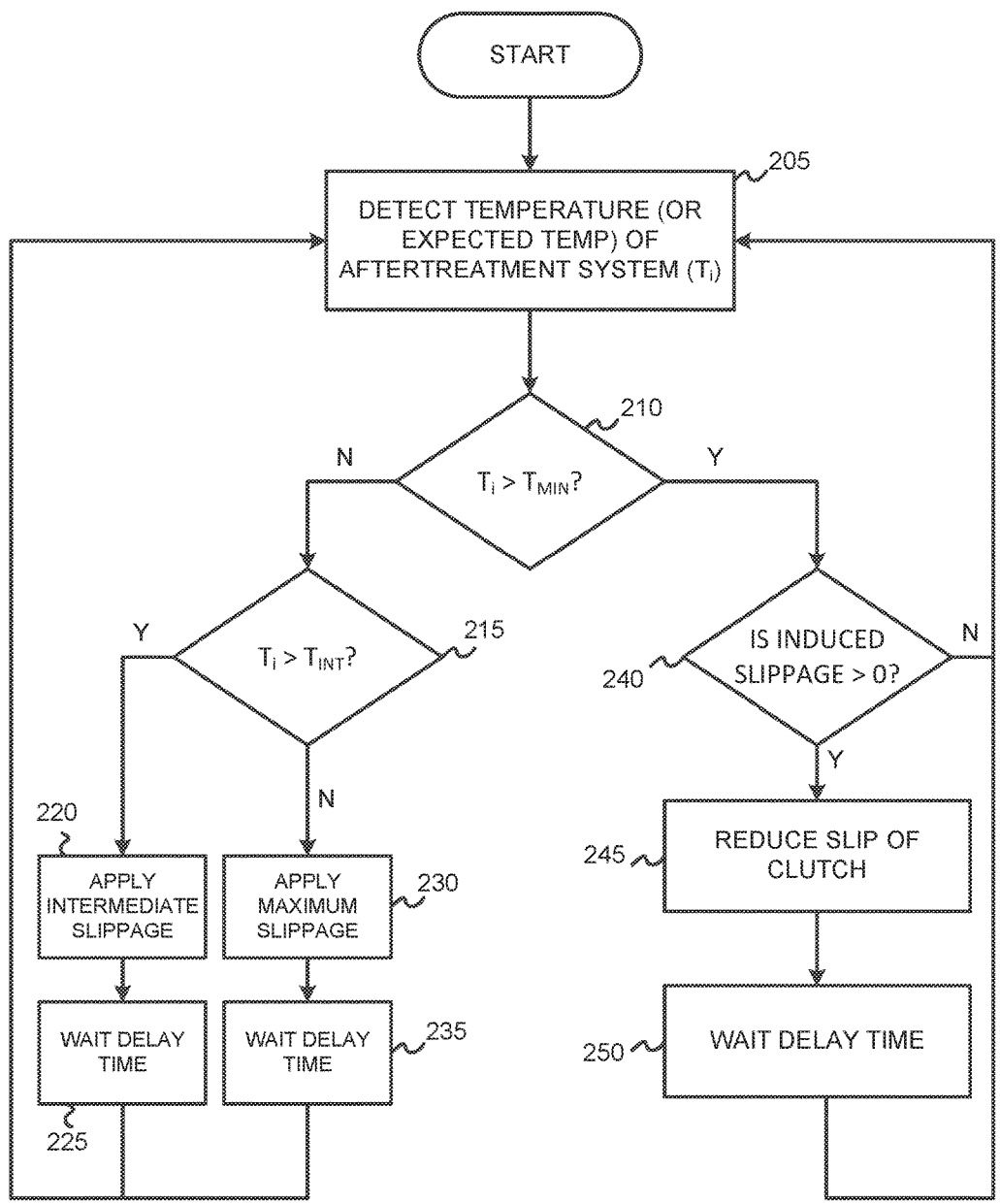
FIG. 2 is a flowchart showing operation of the controller of FIG. 1.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring initially to FIG. 1, an illustrative vehicle system 10 is shown including an engine 12. Engine 12 is any type of internal combustion engine, such as a diesel, gasoline, or natural gas engine, and/or combinations thereof The illustrative system 10 of FIG. 1 also includes an aftertreatment system 14 fluidly coupled to engine 12 to receive and treat exhaust gases from engine 12 before releasing the exhaust gases to the atmosphere. Aftertreatment system 14 illustratively includes one or more oxidation catalyst components (e.g., a diesel oxidation catalyst ("DOC")), $NO_x$ treatment components (e.g., a three-way catalyst, a lean $NO_x$ catalyst, a selective catalytic reduction ("SCR") catalyst), filtration components, either catalyzed or uncatalyzed (e.g., a diesel particulate filter ("DPF")), and/or cleanup catalyst components (e.g., an ammonia oxidation catalyst).

The illustrative system 10 of FIG. 1 further includes a drivetrain 20 coupled to engine 12 to deliver power from engine 12 to motive elements (e.g., wheels) to propel the vehicle. Drivetrain 20 includes a transmission 22 coupled to engine 12 via a clutch assembly 24 having a clutch disc or plate 26. In one embodiment, clutch assembly 24 is a wet clutch, wherein the clutch plate 26 is immersed in a fluid that provides cooling and lubrication. Embodiments are envisioned using a dry clutch as well. In FIG. 1, clutch assembly 24 is shown between engine 12 and transmission 22, but it is also within the scope of the present disclosure that clutch assembly 24 is located within transmission 22 (e.g., controlling one of multiple planetary gear sets of an automatic transmission). It is also within the scope of the present disclosure that clutch assembly 24 is a torque converter lock-up clutch.

The clutch plate 26 is illustratively moved relative to a flywheel 28 of engine 12 under hydraulic pressure or another suitable pressure source. When full pressure (e.g., 100% pressure) is applied to the clutch plate 26, the clutch plate 26 is positioned in full frictional engagement (e.g., 100% engagement) with a flywheel 28 of engine 12 to rotatably couple clutch plate 26 to flywheel 28. In this arrangement, engine 12 delivers power downstream to drivetrain 20 and the motive elements of the vehicle. When the pressure on the clutch plate 26 is removed, the clutch plate 26 is illustratively biased to separate from flywheel 28 and uncouple engine 12 from drivetrain 20 and the motive elements of the vehicle.

In certain situations, as discussed further below, a partial pressure (e.g., 95%, 90%, 85%, or less pressure) is applied to clutch plate 26 to position clutch plate 26 in partial engagement (e.g., 95%, 90%, 85%, or less engagement) with flywheel 28 to create a relatively loose or slip condition. This partial engagement is sufficient to transfer some of the power from engine 12 to drivetrain 20 and the motive elements of the vehicle, but some of the power from engine 12 is dissipated when the clutch plate 26 slips past the flywheel 28.

The illustrative system 10 of FIG. 1 further includes one or more controllers 30 for controlling engine 12, aftertreatment system 14, and/or drivetrain 20. Controller 30 illustratively includes one or more computing devices having memory, processing, and communication hardware and/or software to receive one or more inputs, process the inputs, and generate one or more outputs based on the inputs. In one example, controller 30 is a single device. However, embodiments are envisioned where controller 30 is a distributed device. Controller 30 illustratively includes one or more modules structured to functionally execute the operations of controller 30. These modules are illustratively implemented in hardware and/or software on a non-transient computer readable storage medium, and modules may be distributed across various hardware or software components. Controller 30 illustratively communicates information via datalinks, network communications, and/or electronic signals (e.g., a voltage, frequency, current, or pulse-width modulation (PWM) signal), for example. System 10 further includes slippage inducer 50. Slippage inducer 50 is illustratively one or more processors (such as processors of controller 30) executing code to control operation of clutch assembly 24.

In FIG. 1, controller 30 is shown in communication with a temperature sensor 40 that measures an indicating temperature ($T_i$) of aftertreatment system 14. In one embodiment, a temperature of exhaust gasses being supplied to and treated by aftertreatment system 14 is used as the temperature ($T_i$) of aftertreatment system 14. In other embodiments, a temperature at a certain point within aftertreatment system 14 is used as the temperature ($T_i$) of aftertreatment system 14. Thus, while temperature sensor 40 is shown at an inlet to aftertreatment system 14, embodiments are envisioned utilizing other locations for temperature sensor 40 in aftertreatment system 14. Regardless of the specific point chosen to provide the temperature ($T_i$) of aftertreatment system 14, the corresponding minimum temperature ($T_{min}$), discussed below, is chosen/determined based on the chosen point for measuring the temperature ($T_i$) of aftertreatment system 14.

Controller 30 is also shown in communication with an engine speed sensor 42 that measures the speed of engine 12 and a vehicle speed sensor 44 that measures the actual or commanded speed (e.g., from an operator or cruise control input) of the vehicle. Additional sensors may be provided to send appropriate information to controller 30.

Depending upon the specific aftertreatment components used in aftertreatment system 14, in certain embodiments, $T_i$ of aftertreatment system 14 affects the ability of aftertreatment system 14 to function properly, to function efficiently, and/or to regenerate or recover storage capacity or catalytic activity. Aftertreatment system 14 is associated with, at least in some operating conditions, a minimum temperature ($T_{min}$). $T_{min}$ is illustratively selected such that a response is initiated when $T_i$ is below or expected to fall below $T_{min}$, as discussed further below. For example, $T_{min}$ is illustratively selected as: a value at or near (e.g., within 10° C., within 25° C.) an efficient operating point for aftertreatment system 14; a value at or near (e.g., within 10° C., within 25° C.) a capable operating point for aftertreatment system 14, where aftertreatment system 14 is still capable of meeting emissions targets; or a value at or near (e.g., within 10° C., within 25° C.) a "hold-warm" target for aftertreatment system 14, where aftertreatment system 14 is expected to be capable of reaching efficient or capable operating points within a prescribed time period, within a prescribed performance impact, and/or within a prescribed fuel economy impact. $T_{min}$ illustratively varies based on various system conditions. For example, $T_{min}$ is be increased when an air flow rate through engine 12 is high, and/or when heat transfer to ambient from aftertreatment system 14 is high, such as in cold ambient temperatures, at high vehicle speeds, and in road splash conditions. Such conditions may be detected directly or inferred from temperature modeling and/or temperature feedback parameter comparisons.

In operation, controller 30 illustratively determines when $T_i$ of aftertreatment system 14 is below or expected to fall below $T_{min}$. (Block 205) In one embodiment, this determination is made based on information received directly from temperature sensor 40. In another embodiment, this determination is made based on information received from an aftertreatment thermal support unit (not shown) in communication with temperature sensor 40. If necessary, controller 30 takes corrective action to increase $T_i$ of aftertreatment system 14 above $T_{min}$.

According to an exemplary embodiment of the present disclosure, controller 30, including slippage inducer 50, controls slippage of clutch assembly 24 based on the above-described $T_i$ of aftertreatment system 14. Controlling slippage of clutch assembly 24 illustratively involves altering the pressure applied to clutch plate 26 of clutch assembly 24 against flywheel 28 of engine 12. Controller 30 also controls slippage of clutch assembly 24 based on information from the engine speed sensor 42, information from the vehicle speed sensor 44, and/or other vehicle information. In such embodiments, such vehicle/engine speed sensor and other vehicle information is used to provide a confirmation of the conditions generated by the clutch setting instructed by controller 30. Indeed, it is expected that vehicle conditions generated by a clutch setting will differ as clutch assembly 24 wears over time. Accordingly, vehicle sensors provide an avenue by which the desired settings and heat profile generated thereby can be monitored and confirmed or adjusted.

When $T_i$ of aftertreatment system 14 is below or expected to fall below $T_{min}$, (Block 210) controller 30 attempts to increase $T_i$ by causing slippage in clutch assembly 24. If clutch plate 26 is fully engaged with flywheel 28, controller 30 decreases the pressure on clutch plate 26 to a partial pressure to loosen clutch plate 26 relative to flywheel 28 and allow slippage between clutch plate 26 and flywheel 28 (Blocks 215, 220, 225, 230, 235). As discussed above, the slipping clutch assembly 24 transfers some of the power from engine 12 to the motive elements of the vehicle. However, the slipping clutch assembly 24 increases the power demand on engine 12 due to the power that dissipates when the clutch plate 26 slips past the flywheel 28. The slipping clutch assembly 24 also increases the temperature of any fluid surrounding the clutch assembly 24. As a result, the temperature of the exhaust gases from engine 12, and ultimately $T_i$ of aftertreatment system 14, increases. When $T_i$ of aftertreatment system 14 is sufficiently high, controller 30 returns the clutch plate 26 into normal engagement with flywheel 28 (Block 245). It should be appreciated that there is a minimum amount of engagement (maximum induced slippage) that is permitted during running operation. In one embodiment, when $T_i$ of aftertreatment system 14 is determined to be above a reference temperature, then controller 30 reduces the induced slippage, eventually returning the clutch plate 26 into normal engagement with flywheel 28. In another embodiment, when $T_i$ is greater than $T_{min}$ controller 30 determines if any artificial slippage is being directed. If so, then such induced slippage is reduced. This continues until all induced slippage is removed and engine 12 and aftertreatment system 14 is able to continue normal operation.

In one embodiment, controller 30 provides varying levels of slippage based on $T_i$ of aftertreatment system 14. For example, controller 30 provides more slippage (e.g., 85% engagement) when $T_i$ is low and less slippage (e.g., 95 % engagement) as $T_i$ increases toward $T_{min}$. Thus, in one embodiment, when $T_i$ is below $T_{min}$ and below another intermediate reference temperature ($T_{Int}$) (Block 215) a setting of maximum slippage is illustratively instructed (Block 230). Upon detecting $T_i$ above $T_{Int}$ but still below $T_{min}$, a second lower amount of slippage is illustratively called for (Block 220). It should be appreciated that while only one intermediate temperature and slippage setting is discussed, embodiments are envisioned where multiple gradations are used. Also, once the minimum temperature is achieved, any induced slippage (Block 240) is reduced (Block 245) until the induced slippage is fully removed. In one example, controller 30 adjusts slippage by reducing slippage in response to detecting that the temperature has risen relative to a previously detected temperature. Furthermore, once a slippage adjustment is ordered, controller 30 waits a delay time (Blocks 225, 235, 250) and then determines the temperature or expected temperature again (Block 205).

Controller 30 also controls $T_i$ of aftertreatment system 14 by, for example, commanding engine 12 to run at a higher speed idle condition, providing post fuel injection, increasing an exhaust gas recirculation ("EGR") fraction, bypassing all or a portion of an EGR cooler, bypassing all or a portion of a charge air cooler, increasing a back pressure on engine 12 with a variable geometry turbocharger ("VGT"), changing valve timing to reduce an engine air flow rate, increasing an accessory load on engine 12, and/or reducing heat transfer to an engine radiator.

Other aspects of system 10 may be found in International Patent Application No. PCT/US2014/016818, entitled "System, Method, and Apparatus for Managing Aftertreatment Temperature," filed Feb. 18, 2014, the disclosure of which is expressly incorporated herein by reference in its entirety.

It should be appreciated that while certain functionality and properties are discussed herein with respect to controller 30 and with respect to slippage inducer 50, it is understood that there is not intended to be a bright line between the two. Indeed, slippage inducer 50 is illustratively part of controller 30 and features attributed to controller 30 are further understood to be attributed to slippage inducer 50 in certain embodiments.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle system comprising:
   an engine;
   an aftertreatment system that receives exhaust gas from the engine;
   a clutch assembly; and
   a computing device configured to direct adjusting slippage of the clutch assembly based on a first temperature that is selected from the group consisting of a temperature of the aftertreatment system and an expected temperature of the aftertreatment system by directing the clutch assembly to:
   provide a first level of slippage when the first temperature is above a first reference temperature and above a second reference temperature;
   provide a second level of slippage that is more than the first level of slippage when the first temperature is below the first reference temperature and above the second reference temperature; and
   provide a third level of slippage that is more than the second level of slippage when the first temperature is below the first reference temperature and below the second reference temperature.

2. The system of claim 1, where the computing device directs adjustment of slippage of the clutch assembly by adjusting a pressure supplied to a clutch plate of the clutch assembly.

3. The system of claim 1, wherein the computing device directs adjustment of slippage of the clutch assembly by loosening an engagement between a clutch plate of the clutch assembly and a flywheel of the engine.

4. The system of claim 1, wherein the clutch assembly is selected from a clutch assembly that couples the engine to the transmission, a clutch assembly within the transmission, and a clutch assembly within a torque converter.

5. The system of claim 1, wherein the computing device directs adjustment of slippage of the clutch assembly when the first temperature of the aftertreatment system is below the second reference temperature.

6. The system of claim 5, wherein the computing device directs a reduction in slippage of the clutch assembly responsive to detecting that the first temperature of the aftertreatment system has risen.

7. The system of claim 5, wherein the computing device directs an increase in slippage of the clutch assembly responsive to detecting that the first temperature of the aftertreatment system is below the second reference temperature.

8. The system of claim 7, wherein the increase in the slippage directed by the computing device is a function of the difference between the first temperature of the aftertreatment system and the second reference temperature.

9. A method including:
   adjusting slippage of a clutch assembly responsive to determining a first temperature selected from the group consisting of a temperature of an exhaust aftertreatment system and an expected temperature of the exhaust aftertreatment system, wherein adjusting the slippage of the clutch assembly comprises:
   providing a first level of slippage when the first temperature is above a first reference temperature and above a second reference temperature;
   providing a second level of slippage that is more than the first level of slippage when the first temperature is below the first reference temperature and above the second reference temperature; and
   providing a third level of slippage that is more than the second level of slippage when the first temperature is below the first reference temperature and below the second reference temperature.

10. The method of claim 9, further including:
determining the first temperature;
determining that the first temperature is less than the first reference temperature; and
inducing increased slippage in the clutch assembly by providing at least one of: the second level of slippage and the third level of slippage, responsive to determining that the first temperature of the exhaust aftertreatment system is below the first reference temperature.

11. The method of claim 9 wherein providing the second level of slippage further includes determining that the first temperature of the exhaust aftertreatment system is above the second reference temperature; and reducing induced slippage in the clutch assembly responsive to the determining that the first temperature of the aftertreatment system is above the second reference temperature.

12. The method of claim 9, wherein adjusting slippage of the clutch assembly includes adjusting a pressure supplied to a clutch plate of the clutch assembly.

13. The method of claim 9, wherein the adjusting slippage includes providing an increase in slippage in an amount that is a function of the difference between the first temperature of the aftertreatment system and the second reference temperature.

14. The method of claim 9, wherein adjusting slippage of the clutch assembly includes reducing slippage of the clutch assembly responsive to detecting that the first temperature of the aftertreatment system has risen.

15. A computer readable medium containing non-transitory instructions thereon, that when interpreted by at least one processor cause the at least one processor to:
adjust slippage of a clutch assembly responsive to determining a first temperature selected from the group consisting of a temperature of an exhaust aftertreatment system and an expected temperature of the exhaust aftertreatment system by directing the clutch assembly to:
provide a first level of slippage when the first temperature is above a first reference temperature and above a second reference temperature;
provide a second level of slippage that is more than the first level of slippage when the first temperature is below the first reference temperature and above the second reference temperature; and
provide a third level of slippage that is more than the second level of slippage when the first temperature is below the first reference temperature and below the second reference temperature.

16. The computer readable medium of claim 15, wherein the instructions further cause the at least one processor to:
determine the first temperature;
determine that the first temperature is less than the first reference temperature; and
induce increased slippage in the clutch assembly by providing at least one of: the second level of slippage and the third level of slippage, responsive to determining that the first temperature of the aftertreatment system is below the first reference temperature.

17. The computer readable medium of claim 15 wherein providing the second level of slippage includes:
determining that the first temperature of the exhaust aftertreatment system is above the second reference temperature; and
reducing induced slippage in the clutch assembly responsive to the determining that the first temperature of the aftertreatment system is above the second reference temperature.

18. The computer readable medium of claim 15, wherein adjusting slippage of the clutch assembly includes adjusting a pressure supplied to a clutch plate of the clutch assembly.

19. The computer readable medium of claim 15, wherein adjusting slippage includes providing an increase in slippage in an amount that is a function of the difference between the first temperature of the aftertreatment system and the second reference temperature.

20. The computer readable medium of claim 15, wherein adjusting slippage includes reducing slippage of the clutch assembly responsive to detecting that the first temperature of the aftertreatment system has risen.

* * * * *